US011520595B2

(12) United States Patent
Dang et al.

(10) Patent No.: US 11,520,595 B2
(45) Date of Patent: Dec. 6, 2022

(54) INDUSTRIAL INTERNET OF THINGS GATEWAY BOOT METHODS

(71) Applicant: Schlumberger Technology Corporation, Sugar Land, TX (US)

(72) Inventors: Anh Dang, Katy, TX (US); Maria Krovatkina, Sugar Land, TX (US); Martin Ernst, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 755 days.

(21) Appl. No.: 16/509,663

(22) Filed: Jul. 12, 2019

(65) Prior Publication Data

US 2021/0011734 A1 Jan. 14, 2021

(51) Int. Cl.
*G06F 9/44* (2018.01)
*G06F 9/4401* (2018.01)
*H04L 9/08* (2006.01)

(52) U.S. Cl.
CPC ............ *G06F 9/4401* (2013.01); *H04L 9/088* (2013.01)

(58) Field of Classification Search
CPC .............................. G06F 9/4401; H04L 9/088
See application file for complete search history.

(56) References Cited

U.S. PATENT DOCUMENTS

| 11,409,878 | B2* | 8/2022 | Ali | G06F 21/572 |
| 2015/0074384 | A1* | 3/2015 | Yajima | G06F 21/575 |
| | | | | 713/2 |
| 2016/0140343 | A1* | 5/2016 | Novak | G06F 21/575 |
| | | | | 713/2 |
| 2018/0373878 | A1* | 12/2018 | Jung | H04L 9/0894 |
| 2018/0375662 | A1* | 12/2018 | Domke | G06F 3/0679 |
| 2019/0236280 | A1* | 8/2019 | Sheng | G06F 9/4401 |
| 2020/0042709 | A1* | 2/2020 | Fu | H04L 9/0643 |
| 2021/0342491 | A1* | 11/2021 | Vetteth | H04L 9/0643 |
| 2022/0083640 | A1* | 3/2022 | Duval | G06F 9/4401 |

* cited by examiner

*Primary Examiner* — Zahid Choudhury

(57) ABSTRACT

An industrial internet of things gateway boot method is described wherein installation, operation and maintenance phases are controlled to limit the chance of a malicious attack on a connected network.

15 Claims, 6 Drawing Sheets

INDUSTRIAL INTERNET OF THINGS GATEWAY BOOT METHODS

CROSS-REFERENCE TO RELATED APPLICATIONS

None.

STATEMENT REGARDING FEDERALLY SPONSORED RESEARCH OR DEVELOPMENT

None.

FIELD OF THE DISCLOSURE

Aspects of the disclosure relate to gateways used in computing arrangements, such as networks and/or cloud computing. More specifically, aspects of the disclosure relate to boot procedures to limit malicious attacks seeking to infect a gateway and/or network.

BACKGROUND INFORMATION

Consistency and reliability are desired quantities when computer operability is desired. System architects try, through their computer architecture designs, to provide a secure environment for transfer of data. Computer hackers, may use malicious means to gain access to a computer network and the data being transferred. In some instances, computer networks may incorporate thousands of components and parts and the vulnerability of just one part of the network may allow a hacker to have unauthorized access to other sections of the network. In oil and gas recovery operations, for example, networks may be used to transfer real time data of field operations to a client or control center. These operations can be significantly safety significant if a breach were to occur.

With the advent of interconnected computers, computer networks and cloud systems allow for exchange of data in real time, potentially greatly enhancing work efficiency. One challenge with computer networks, however, is that with an increase in the number of network-enabled devices, many different pathways exist in which a possible attack on the network may be performed.

In other environments, with the great number of computer endpoints and the constant maintenance required for the network, malicious attacks can occur from entities that seek out newly added components to a network. Once a portion of the network is compromised, a hacker can attempt to infiltrate other sections of the network. For these reasons, architects seek to provide a defense in depth strategy that seeks to limit the depth of an attack. Some protection schemes attempt to only protect an endpoint of the computer architecture. Some protections schemes attempt to protect web traffic. An often missed potential security protection scheme is to protect gateways to the network.

As safety is paramount in some computer operations, there is a need to provide a method that provides for a check of authenticity at a gateway point for a network to limit unauthorized access.

There is also a need to provide a highly efficient method of computer verification and prevention of attempts to access a network or cloud based structure.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a process for a measured boot process is disclosed. The process may comprise locating each of a BIOS, an operating system loader, and an operating system, measuring a value of each of the BIOS, operating system loader and the operating system, calculating at least one first digest of the BIOS, operating system loader and the operating system. The process may also include storing the at least one first digest of the measured BIOS, operating system loader and the operating system in a platform configuration register of a trusted platform module or other temper-proof security element, starting an immutable boot loader for a computer arrangement and determining when a measured boot process is desired. The process may further include measuring a value of each of the BIOS, operating system loader and the operating system, calculating at least one second digest of the BIOS, operating system loader and the operating system, comparing the at least one second digest to the at least one first digest and performing a boot process only when the second digest is equal to the first digest.

In another embodiment, a process for performing a secure boot process for a computer arrangement is disclosed. The process may comprise starting an immutable boot loader for the computer arrangement and performing at least one measurement of a BIOS for the computer arrangement. The process may further comprise validating the at least one measurement of the BIOS for the computer system with data from a trusted platform module or another security element and executing the immutable boot loader when the validating of the at least one measurement is successful. The process may further comprise performing at least one measurement of an operating system loader for the computer arrangement and validating the at least one measurement of the operating system loader with operating system loader data from the trusted platform module. The process may also comprise executing the BIOs when the validating of the at least one measurement of the operating system loader is successful and performing at least one measurement of an operating system for the computer arrangement. The method may also provide for validating the at least one measurement of the operating system with operating system data from the trusted platform module and executing the operating system loader when the validating of the at least one measurement of the operating system loader is successful. The method may also provide for performing at least one measurement of an application for the computer arrangement, validating the at least one measurement of the application with application data from the trusted platform module and executing the operating system when the validating of the at least one measurement of the application is successful.

In another embodiment, a measured boot process is disclosed. The process may comprise locating each of a BIOS, a GRUB boot loader, and an operating system and measuring a value of each of the BIOS, GRUB boot loader and the operating system. The process may further comprise calculating at least one first digest of the BIOS, GRUB boot loader and the operating system and storing the at least one first digest of the measured BIOS, GRUB boot loader and the operating system in a platform configuration register of a trusted platform module. The method may further comprise starting an immutable boot loader for a computer arrangement and determining when a measured boot process is desired. The method may further comprise measuring a value of each of the BIOS, GRUB boot loader and the operating system and calculating at least one second digest of the BIOS, GRUB boot loader and the operating system. The method may also comprise comparing the at least one second digest to the at least one first digest and performing a boot process only when the second digest is equal to the first digest.

Other aspects and advantages will become apparent from the following description and the attached claims.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope for the disclosure may admit to other equally effective embodiments.

Figure 1:
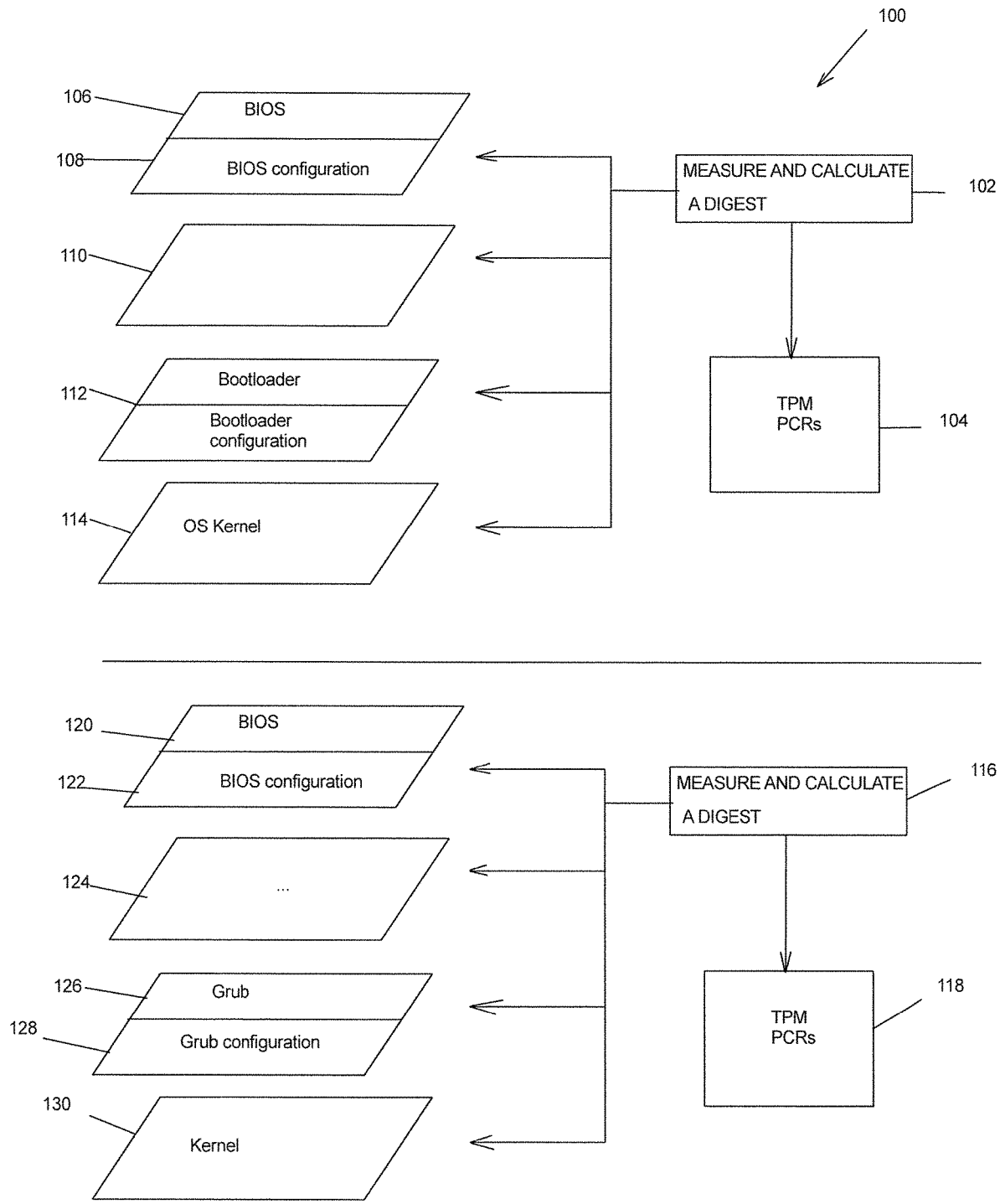
FIG. 1 is an example of a boot object measurement process.

To facilitate understanding, identical reference numerals have been used, wherein possible, to designate identical elements that are common to the figures ("FIGS."). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and shall not be considered to be an element or limitation of the claims except where explicitly recited in a claim.

Although the terms first, second, third, etc. may be used to describe various elements, components, regions, layers and/or sections, these elements, components, regions, layers and/or sections should not be limited by these terms. These terms may be used only to distinguish one element, component, region, layer or section. Terms such as "first", "second" and other numerical terms when used herein do not imply a sequence or order unless clearly indicated by the context.

When an element or layer is referred to as being "on," "engaged to," "connected to," or "coupled" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes an and all combinations of one or more of the associated listed terms.

Some embodiments will not be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above and below a given point are used in this description to more clearly describe certain embodiments.

In embodiments, aspects of the disclosure provide for a method for enabling hardware root of trust and a secure boot process for an industrial internet of things gateway. To perform such a task, an authentication process may be used. In one embodiment, an attestation process is used for validation during a secure boot process. In another embodiment, a measuring process of different values of code may occur, with a comparison of the measured values to expected values of these components. The authentication process is used to confirm that the identity of the accessing system is not compromised when requesting access through a gateway. As will be understood, actions taken may be on encrypted data or unencrypted data and keys to decrypt encrypted data may be stored in various locations as described below. Aspects of the disclosure are significantly different than that described in conventional arrangements and methods. As an example, conventional arrangements and methods have difficulty in certificate management issues. Such conventional arrangements and method that are used are not efficient.

Aspects of the disclosure also provide for a flexibility of use, such that a user, a system manager or system architect may allow certain functions to be performed at certain times, thereby tailoring the system, as needed, to the environment that the computer arrangement may experience. As a non-limiting embodiment, a standardized check, using a core root of trust, may be performed. Utilizing the core root of trust, such as obtained from a hardware manufacturer, for example, will prevent devices, such as gateways that have been modified from accepted parameters from successfully connecting to a gateway network, other IIOT systems, the like, or combinations thereof and doing harm to a network or cloud based system. As the systems and methods described are able to be configured, system architects or managers may reset or alter access to the network in the event of a compromise situation.

Aspects of the disclosure also allow for pinpointing a compromised computer that is attempting to access a gateway. Notification procedures may be performed such that upon a failure to access a gateway, a log is created in the compromised computer such that retroactive diagnostics can be used to identify the problems associated with connecting to the gateway.

Aspects of the disclosure also allow for each individual computer to be protected with a security feature that eliminates access by hackers who may attempt to use a similar access method on other endpoints. The unique protection system for each endpoint provides each system with a non-repetitious manner of accessing the network.

In embodiments, a root of trust is used as a basis for activities to be completed by a computer set to access a network. In one embodiment, the root of trust is a set of security components where correctness is established and assumed from higher layers of hardware and software, up to and including the operating system as well as installed applications. A chain of trust is the term used to describe a trust relationship between system components. If a security claim of trust can be verified and maintained on an industrial internet of things endpoint from its root of trust, the endpoint is considered trustworthy and secure. If a break occurs anywhere between the root of trust and the ultimate loading of the operating system and applications, embodiments are designed to prevent any loading of the operating system from occurring. Only when all checks have been completed is a user granted access, through the gateway, to a network.

Two different security implementations may be used on the endpoint that leverages the root of trust and the chain of trust. These two different security implementations are measured boot and secure boot processes, as described later.

In one example embodiment, the measured boot chain, specific components of code are measured by a predecessor step before aspects of the specific code are executed. The measured value is stored and can be securely retrieved later to determine what component was loaded during the boot process. Security decisions are made by making a comparison between the measured values and "known" values that correspond to the measured values. If a difference is found between the measured value and the "known" good value, then the process is stopped and no access to the network is provided. In embodiments, a log may be maintained to allow an architect to determine the reason for the failure to connect to the gateway.

In another example embodiment, called a secure boot chain, each component in the boot process checks a cryptographic signature of the next component before executing it. The boot chain starts from an immutable bootloader which is a core root of trust. The code of each component in the boot chain, in non-limiting embodiments, is signed by a software manufacturer. If there is any unauthorized modification on the code, the signature will not match, and the code will not be executed. As a consequence, the device will not boot.

In embodiments, a trusted platform module ("TPM"). The TPM is a dedicated crypto processor to securely store artifacts ("data") used to authenticate the hardware platform for either the measured boot process or the secure boot process. These artifacts may include passwords, certificates or encryption keys. A TPM can also be used, in embodiments, to store platform measurements that can help ensure that the platform remains trustworthy. As will be understood, other tamper proof security elements and/or systems may be used and as such, the disclosed embodiment should not be considered limiting.

In embodiments, methods described may take measurements of certain pieces of code or activities of the platform. In non-limiting embodiments, these measurements may be computing hashes of code fragments, measuring the speed with certain operations are executed or computing the hash method containing certain characteristic values from machine different specific items, like serial numbers, MAC addresses, etc. In the embodiments described, a hash function is any function that can be used to map data of arbitrary size onto data of a fixed size.

A register inside the TPM, called a platform configuration register ("PCR") is designed to store measurements completed, such as a digest generated by an associated hashing algorithm. In embodiments, a formula may be used for storage of data within the PCR.

Methods and apparatus used herein, however, may obtain data ("measure data") during different steps of a process, such as during a boot loader, loading of BIOS, and loading of an operating system. Other embodiments may obtain data ("measure data") from GRUB or GRUB configuration code. After such measurement has been completed, then an overall check of the data obtained is performed. The check performed, may be a single check, to permit access to other functions of the gateway. Such actions allow for interconnectivity of the computer arrangement attempting to connect to a secured network. Aspects of the disclosure provide a high security throughout the lifecycle of the gateway for the system. As defined, the lifecycle may include the initial installation phase, the operation phase and the maintenance phases of the system.

In other embodiments, a verification or attestation may be performed after each time a portion of data is measured. If the verification is not successfully performed after each portion of data is measured, then further computer actions may be halted and access to the network denied.

Referring to FIG. 1, a boot object measurement process is disclosed. A computing arrangement, at 102 is configured to measure and calculate a digest for each of a BIOS 106, the BIOS configuration 108, other data associated with booting of the computer system 110, the bootloader and bootloader configuration 112 and the operating system ("OS") kernel 114. The values are obtained at 102 and then stored in a trusted platform module ("TPM") and/or platform configuration register ("PCR") 104. The values may be placed in any form for retrieval and comparison at a later date. As will be understood, different numbers of measurements may be performed on different code and therefore the example embodiment should not be considered limiting. In this embodiment, each element 106, 108, 110, 112 and 114 are measured and stored. After the measurements are conducted, a comparison is performed between data located with the computing arrangement on values that are "expected" to ones that were found during the measurement process at 106, 108, 110, 112 and 114. If the expected values are the same as the measured values in 106, 108, 110, 112 and 114, then access to the gateway is granted. In an instance wherein the measured values in 106, 108, 110, 112 and 114 are not the same as the expected values, then no access is provided to the gateway.

As will be understood, in instances where no access is provided through the gateway, a notification may be provided that a failed attempt has been tried through an accessing computer so that architects may neutralize further attempts from this access point of may send a technician to the accessing computer to ascertain the attempt history and problems encountered.

As will be further understood, a single check of measured objects may be accomplished. Such a method is a significant departure from conventional methods that continually check object measurements after multiple phases of an attempted access process. The aspects provided here provide for a more compact handling of data that is more efficient than conventional methods.

In a similar fashion, the computing arrangement, at 116 is configured to measure and calculate a digest for each of a BIOS 120, the BIOS configuration 122, other data associated with booting of the computer system 124, the Grub 126 and Grub configuration 128 and kernel 130. The values are obtained at 116 and then stored in a trusted platform module ("TPM") platform configuration register ("PCR") 118. As will be understood, the Grub 126 is a bootloader program that allows different or multiple operating systems to be used on a single computer. In such applications, therefore, the user may perform different operating systems. The bootloader programs, may be front end loaded, prior to operating system choice, thereby protecting the network and computer prior to any choice being made by a user.

In embodiments, a core root of trust may be used. The core root of trust may be, for example, provided on a hardware platform from a manufacturer. Architects will therefore have a unique set of measurements that must be replicated before a key is provided for decrypting information and continued access is provided to the gateway and beyond.

In other non-limiting embodiments, the core root of trust may be software based and located on each accessing computer. The core root of trust, thereafter, may be maintained by the architect.

Figure 2:
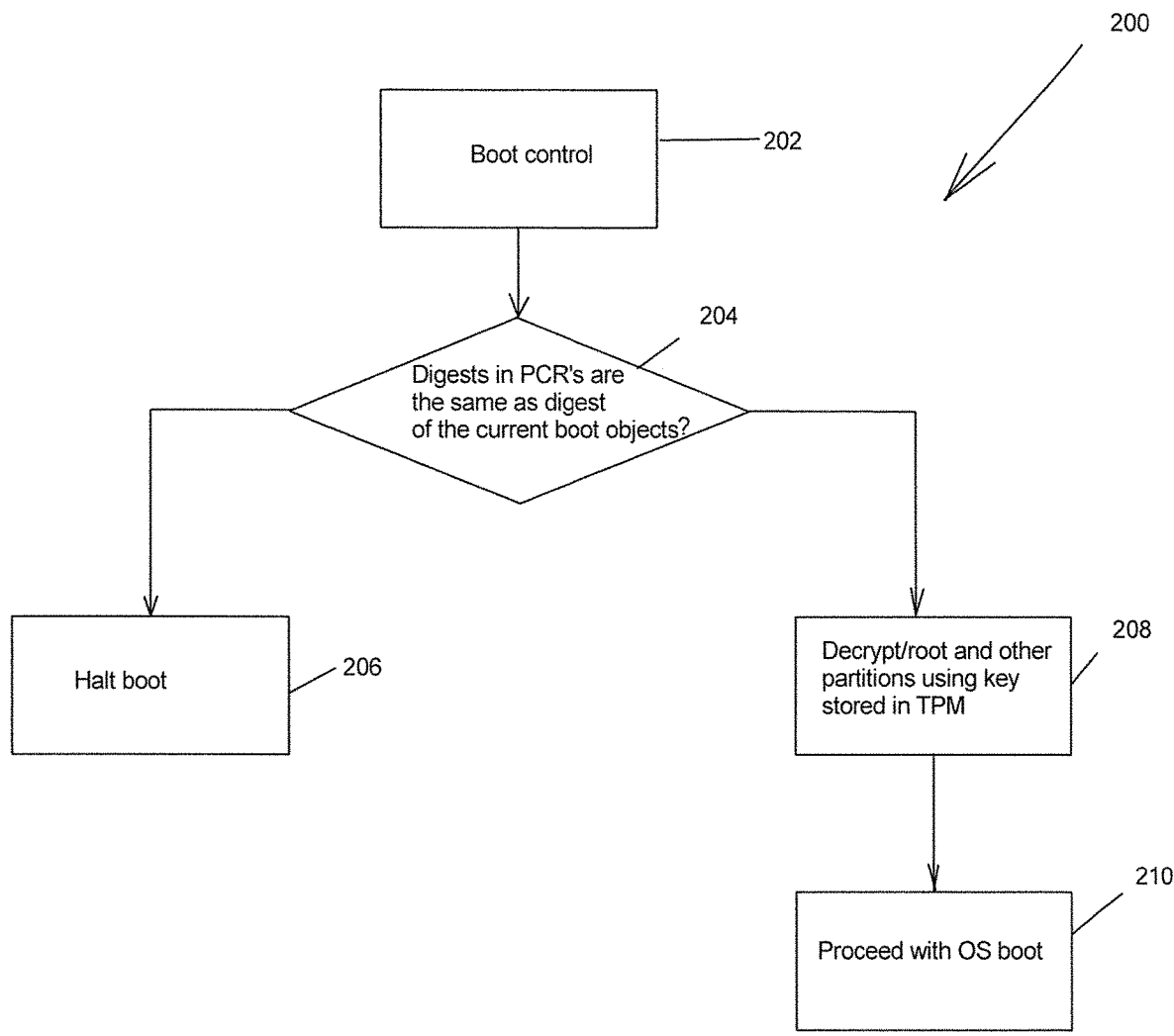
FIG. 2 is an example of a boot process with a secure boot feature activated.

Referring to FIG. 2, a method 200 with a secure boot feature is performed. As will be understood, when an option is chosen that a secure boot is needed, such instructions are stored in boot control 202 or are accessed by boot control 202. At 204, a decision is reached as to if the digests in PCR's are the same as a digest of the current boot objects. If digests in PCR's are not the same as the current boot objects, then the boot is halted at 206. A notification may be provided to the user that the boot has been halted for the non-matching digests. If, at 204, the digests in PCR's are the same as digests of the current boot objects, then a decryption of the root and/or other partitions may be performed using a key stored in the TPM at 208. Once decryption is completed at 208, the operating system may boot at 210. It is to be noted that such a method only provides a key after measurement of the features occurs and a verification has occurred. In the instance that measurements have been taken and the digests do not match, then no access is provided to the gateway.

Figure 3:
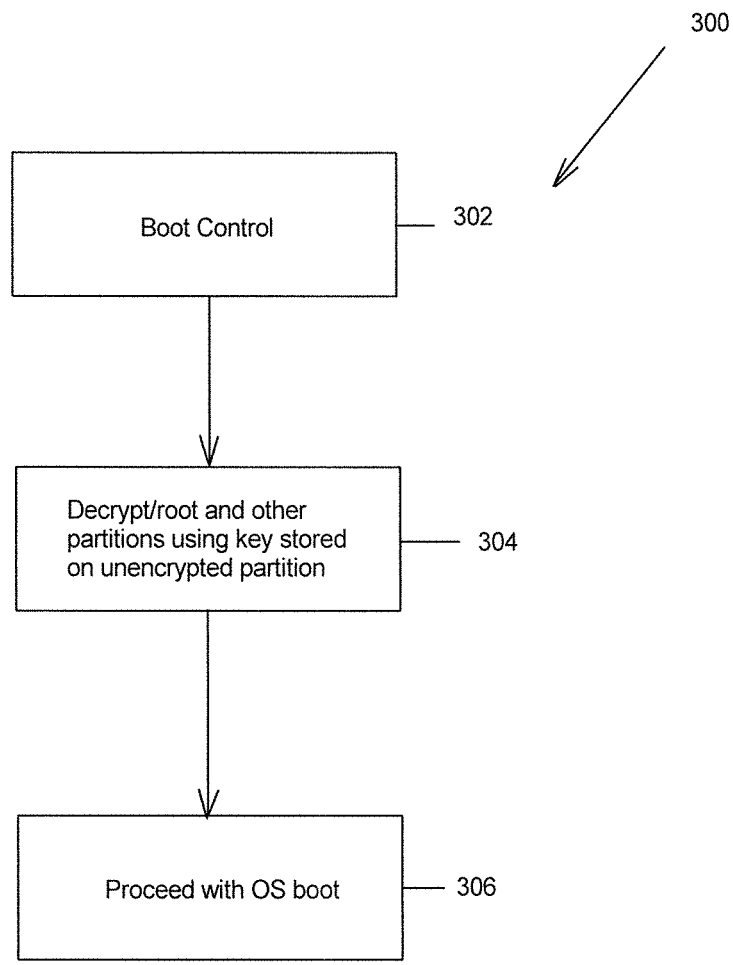
FIG. 3 is an example of a boot process with the secure boot feature deactivated.

Referring to FIG. 3, an example method 300 for performing a boot process with a secure boot feature that is deactivated is illustrated. As will be understood, when an option is chosen that a secure boot is not needed, such instructions are stored in boot control 302 or are accessed by boot control 302. The method 300 continues to decrypt a root or other partitions using a key stored in an unencrypted partition 302. Once the root and/or other partitions are decrypted using the key stored on an unencrypted partition 302, the method continues at 304 with proceeding with an operation system boot 306. As will be understood, partitions with code/operations may be stored in a memory. The memory may be a non-volatile memory such that the instructions are not erased upon shutting off of the computer. In other embodiments, a volatile memory may be used wherein a portion of non-volatile memory is programmed to access the volatile memory such that loading of instructions is functionally performed.

Figure 4:
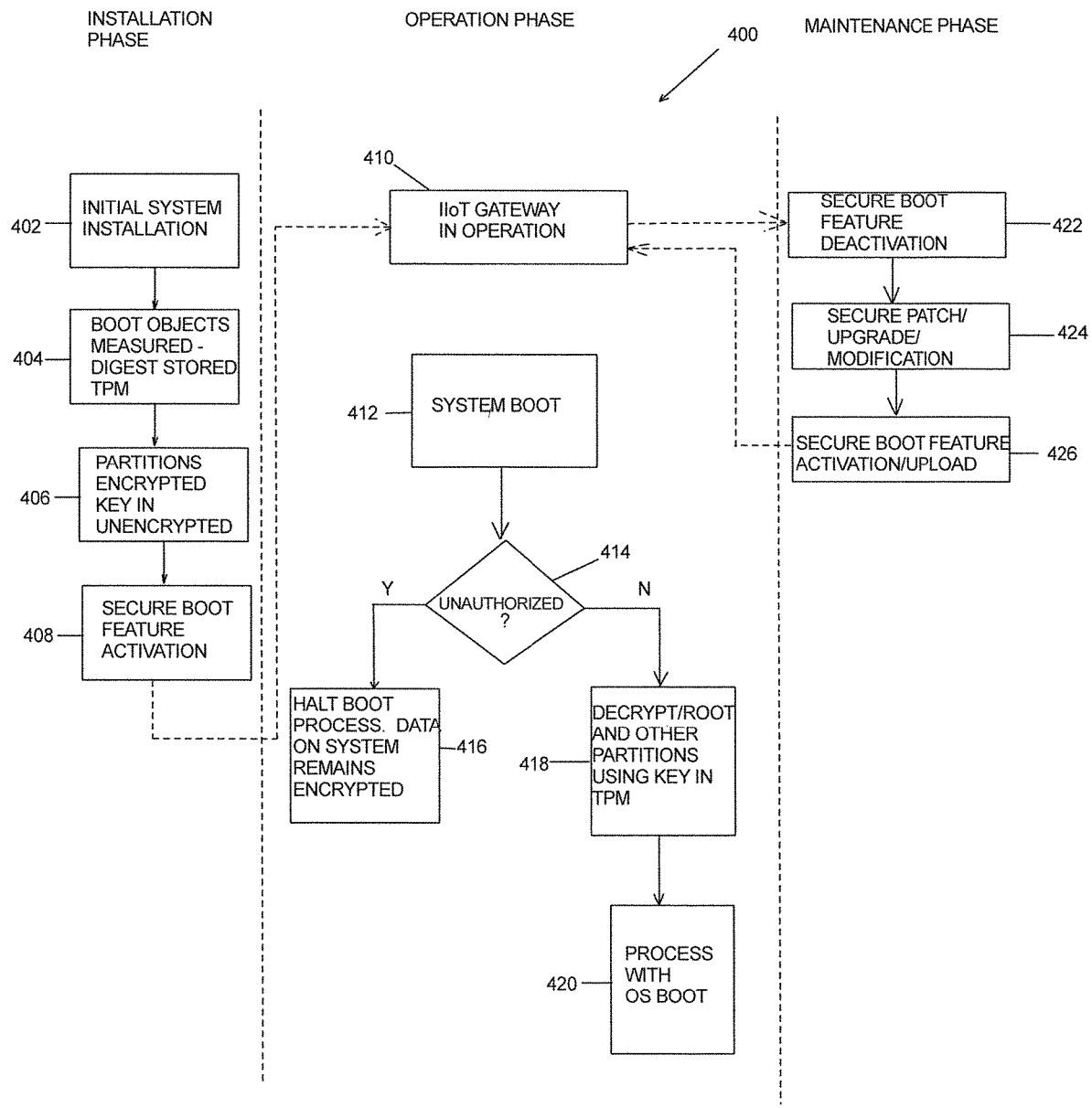
FIG. 4 is a gateway life diagram illustrating installation, operation and maintenance phases of service.

Aspects of the disclosure are presented in FIG. 4, that illustrate an installation phase, operation phase and maintenance phase. The method 400 illustrated provides a continual life-cycle flow chart of the programming as illustrated. An initial system installation is provided, at 402, in the installation phase of the life-cycle. During this installation phase, boot objects are measured and digest is stored at 404. The storage may occur in a memory arrangement, such as a trusted platform module. The memory arrangement may be part of the computing arrangement or may be addressable as per the design of the system architect. At 406, device partitions are encrypted and an encryption key is stored on an unencrypted partition. At 408, a secure boot feature activation is provided, as described above.

Further actions are also illustrated in FIG. 4 in conjunction with the operation phase. At 410, the IIoT gateway is in operation. As illustrated, a secure boot feature is enabled as a default. If maintenance is requested for the method, then permission must be given in a maintenance phase at 422. A modification may be made, at 424, such as through an upgrade, or modification, as non-limiting embodiments. The method may then continue at 426 where the secure boot feature may be activated once again, if necessary. As will be understood, the maintenance phase may include any types of updates, corrections in code and method advances.

As described previously, at 412, a system boot may occur. If there is an unauthorized attempt at access or the security checks, described previously, are not successful in completion, then, at 416, a halt of the boot process is accomplished. At 414, if the attempted boot is not an unauthorized attempt, then a decryption of the root and other partitions may occur using a key stored in the trusted platform module. Then, at 420, the operating system may continue to boot.

As will be understood, the process described in FIG. 4, provides for security throughout the lifecycle of the system. The user is also provided with the ability to modify the installation with upgrades or modifications. Other embodiments provide for storage of keys in secure locations such that authenticity is maintained when access is desired. These storage locations may be in memory arrangements that are dedicated for such actions. Keys may be used, such as encryption keys and the keys may be randomly generated and stored on a partition which is not encrypted. In other embodiments, storage may be performed on an encrypted memory arrangement.

Figure 5:
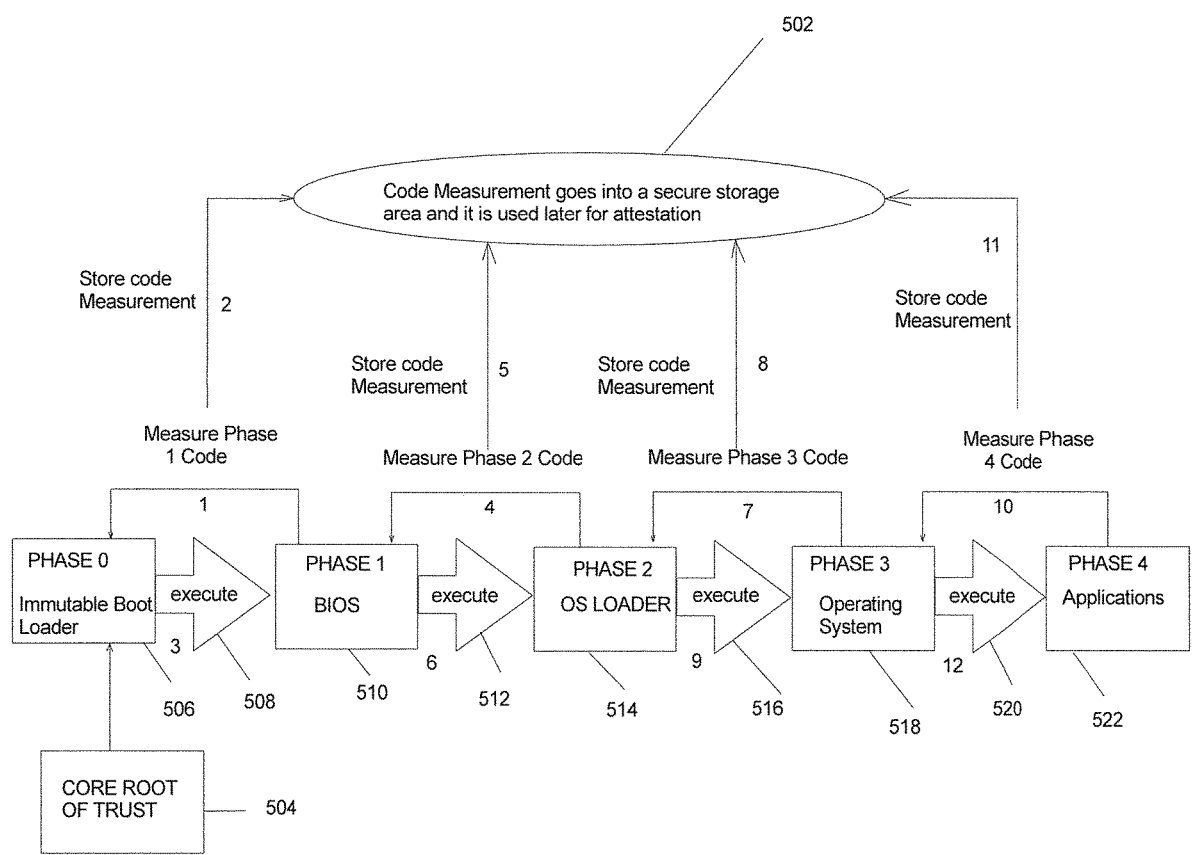
FIG. 5 is a measured boot implementation with hardware based root of trust.

Referring to FIG. 5, a measured boot implementation with a hardware root of trust is illustrated. For simplicity, steps in the method are numbered consecutively from step 1 through 9. A core root of trust 504 is provided at 504. At 510, a BIOS is measured, at 1, and the measurement is stored in a code measurement 2 at a secure storage station or area that will be used later for attestation at 502. After measurement, the method returns back to phase 0 wherein an immutable boot loader 506 is provided and executed 508 at 3. In a similar fashion, an operating system loader in phase 2 at 514 is measured at 4 and the results at stored, at pathway 5, at the code measurement station or area that will be used later for attestation at 502. The method returns to phase 1 BIOS 510 that is then executed at 512. At phase 3, the operating system 518 is measured and the measurement is stored at 502, step 8, similar to the other storage functions 2 and 5. The operating system loader 514 is executed at 516. A phase 4 code, an application, is measured at 10 and stored at 11 in the secure storage area 502. The operating system at 518 is then executed at 520.

A check/comparison is made of the store code measurements from steps 2, 5, 8 and 11 to expected values placed in a secure storage. If the comparison indicates that the values from steps 2, 5, 8 and 11 are identical to pre-existing values stored in 502, then access to the gateway is provided. If the values are not identical, then progress is stopped and no further access is grated. In the illustrated embodiment, different types of comparisons may be used. As a non-limiting embodiment, a hash value may be obtained for the objects being compared. In some non-limiting embodiments, a single value may be compared, rather than a list of values, simplifying the comparison. For example, the check can use hash comparisons, hash extension comparison, compare one value, other known check methods, further known check methods, or combinations thereof. In one or more embodiments, a check can be hash extension expressed as <current stage>+hash of previous stage; accordingly, the hash of a current stage is dependent on a hash of the preceding stage, and if one of the previous stages were changed the subsequent change will be able to detect it the hash extension and a change in one stage will mutate all downstream stages hashes.

Figure 6:
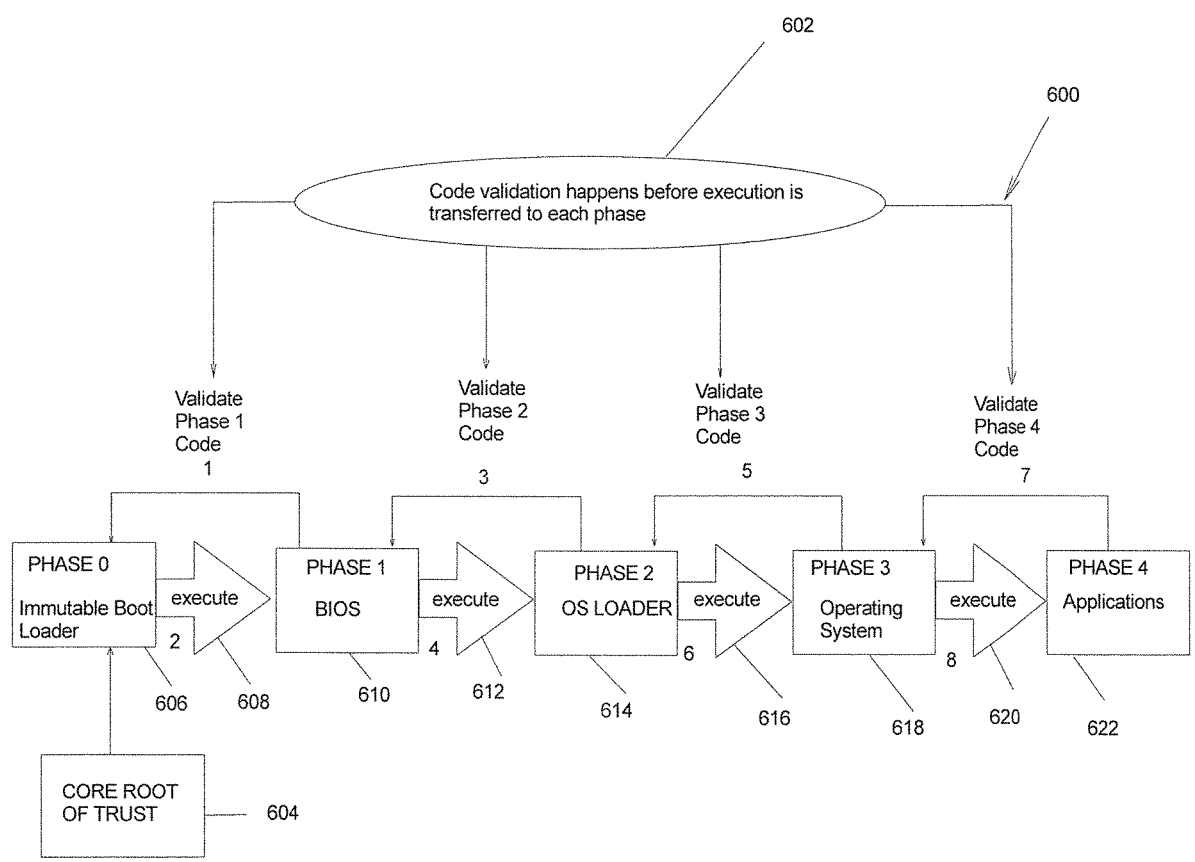
FIG. 6 is a secure boot implementation with hardware based root of trust.

Referring to FIG. 6, a method 600 for a secure boot implementation with a hardware root of trust is illustrated. At 610, a BIOS is validated using a code validation provided at 602. If the validation is successful, then the immutable boot loader at 606 is executed at 608 and the method proceeds to the operating system loader at 614. The operating system loader 614 is validated by data provided at 602 through a comparison. If the validation is successful, then the BIOS 610 may be executed at 612. A similar process is performed for the operating system at 618 that is validated at 5 with data that is provided from 602. If the validation is successful, then the operating system loader is executed and then an application is validated in step 7 with data provided from the code validation at 602. If the validation is successfully performed, then the operating system may be executed. The data can be a signature, for example a PKI based or uefi based, of firmware or software, or other known methods, or future known methods.

As will be understood, the operation of the gateway may provide conversion of different protocols used by computer arrangements seeking to access a network or the internet. The methods described, therefore, provide access to a network only when authentication can be guaranteed through the system boot. The entire network, therefore, that uses access computers that use this technique will be secure for vital operations.

In one embodiment, a measured boot process is disclosed. The process may comprise locating each of a BIOS, an operating system loader, and an operating system, measuring a value of each of the BIOS, operating system loader and the operating system, calculating at least one first digest of the BIOS, operating system loader and the operating system, storing the at least one first digest of the measured BIOS, operating system loader and the operating system in a platform configuration register of a trusted platform module, starting an immutable boot loader for a computer arrangement; determining when a measured boot process is desired; measuring a value of each of the BIOS, operating system loader and the operating system, calculating at least one second digest of the BIOS, operating system loader and the operating system, comparing the at least one second digest to the at least one first digest and performing a boot process only when the second digest is equal to the first digest.

In another embodiment, the process may be performed wherein the performing the boot process includes obtaining a decryption key.

In another embodiment, the process may be performed wherein the decryption key is located in a memory arrangement.

In another embodiment, the process may be performed wherein the memory arrangement is a trusted platform module.

In another embodiment, the process may be performed wherein the trusted platform module has platform configuration registers.

In another embodiment, the process may be performed wherein the trusted platform module has a dedicated crypto processor configured to authenticate a hardware platform.

In another embodiment, the process may be performed wherein the comparing the at least one second digest to the at least one first digest is an attestation service.

In another embodiment, the process may further comprise starting an immutable boot loader prior to the locating each of the BIOS, the operating system loader, and the operating system.

In another embodiment, the process may be performed wherein the starting the immutable boot loader comprises using a core root of trust.

In another embodiment, the process may be performed wherein the performing the boot process only when the second digest is equal to the first digest comprises obtaining a key from a trusted platform module and decrypting at least one partition of the operating system.

In another embodiment, a process for performing a secure boot process for a computer arrangement is disclosed. The process may comprise starting an immutable boot loader for the computer arrangement and performing at least one measurement of a BIOS for the computer arrangement. The process may further comprise validating the at least one measurement of the BIOS for the computer system with data from a trusted platform module and executing the immutable boot loader when the validating of the at least one measurement is successful. The process may further comprise performing at least one measurement of an operating system loader for the computer arrangement and validating the at least one measurement of the operating system loader with operating system loader data from the trusted platform module. The process may also comprise executing the BIOS when the validating of the at least one measurement of the operating system loader is successful and performing at least one measurement of an operating system for the computer arrangement. The method may also provide for validating the at least one measurement of the operating system with operating system data from the trusted platform module and executing the operating system loader when the validating of the at least one measurement of the operating system loader is successful. The method may also provide for performing at least one measurement of an application for the computer arrangement, validating the at least one measurement of the application with application data from the trusted platform module and executing the operating system when the validating of the at least one measurement of the application is successful.

In another embodiment, the process may be performed wherein the immutable bool loader uses data from a core root of trust.

In another embodiment, the process may be performed wherein the core root of trust is based on a hardware identification.

In another embodiment, the process may be performed wherein the trusted platform module includes a dedicated crypto processor configured to store data in a memory arrangement.

In another embodiment, the process may be performed wherein the memory arrangement is a platform configuration register.

In another embodiment, a measured boot process is disclosed. The process may comprise locating each of a BIOS, a GRUB boot loader, and an operating system and measuring a value of each of the BIOS, GRUB boot loader and the operating system. The process may further comprise calculating at least one first digest of the BIOS, GRUB boot loader and the operating system and storing the at least one first digest of the measured BIOS, GRUB boot loader and the operating system in a platform configuration register of a trusted platform module. The method may further comprise starting an immutable boot loader for a computer arrangement and determining when a measured boot process is desired. The method may further comprise measuring a value of each of the BIOS, GRUB boot loader and the operating system and calculating at least one second digest of the BIOS, GRUB boot loader and the operating system. The method may also comprise comparing the at least one second digest to the at least one first digest and performing a boot process only when the second digest is equal to the first digest.

In another embodiment, the process may be performed wherein the performing the boot process includes obtaining a decryption key.

In another embodiment, the process may be performed wherein the decryption key is located in a memory arrangement.

In another embodiment, the process may be performed wherein the memory arrangement is a trusted platform module In one embodiment, the process may be performed wherein the performing the boot process only when the second digest is equal to the first digest comprises obtaining a key from a trusted platform module and decrypting at least one partition of the operating system.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited in the description of the embodiments described herein.

What is claimed is:

1. A measured boot process, comprising:
   locating each of a BIOS, an operating system loader, and an operating system;
   measuring a value of each of the BIOS, operating system loader and the operating system;
   calculating at least one first digest of the BIOS, operating system loader and the operating system;
   storing the at least one first digest of the measured BIOS, operating system loader and the operating system in a platform configuration register of a trusted platform module;
   starting an immutable boot loader for a computer arrangement;
   determining when a measured boot process is desired;
   measuring a value of each of the BIOS, operating system loader and the operating system;
   calculating at least one second digest of the BIOS, operating system loader and the operating system;
   comparing the at least one second digest to the at least one first digest; and
   performing a boot process only when the second digest is equal to the first digest.

2. The process according to claim 1, wherein the performing the boot process includes obtaining a decryption key.

3. The process according to claim 2, wherein the decryption key is located in a memory arrangement.

4. The process according to claim 3, wherein the memory arrangement is a trusted platform module.

5. The process according to claim 4, wherein the trusted platform module has platform configuration registers.

6. The process according to claim 5, wherein the trusted platform module has a dedicated crypto processor configured to authenticate a hardware platform.

7. The process according to claim 1, wherein the comparing the at least one second digest to the at least one first digest is an attestation service.

8. The process according to claim 1, further comprising:
   starting an immutable boot loader prior to the locating each of the BIOS, the operating system loader, and the operating system.

9. The process according to claim 8, wherein the starting the immutable boot loader comprises using a core root of trust.

10. The process according to claim 1, wherein the performing the boot process only when the second digest is equal to the first digest comprises:
    obtaining a key from a trusted platform module; and
    decrypting at least one partition of the operating system.

11. A measured boot process, comprising:
    locating each of a BIOS, a GRUB boot loader, and an operating system;
    measuring a value of each of the BIOS, GRUB boot loader and the operating system;
    calculating at least one first digest of the BIOS, GRUB boot loader and the operating system;
    storing the at least one first digest of the measured BIOS, GRUB boot loader and the operating system in a platform configuration register of a trusted platform module;
    starting an immutable boot loader for a computer arrangement;
    determining when a measured boot process is desired;
    measuring a value of each of the BIOS, GRUB boot loader and the operating system;
    calculating at least one second digest of the BIOS, GRUB boot loader and the operating system;
    comparing the at least one second digest to the at least one first digest; and
    performing a boot process only when the second digest is equal to the first digest.

12. The process according to claim 11, wherein the performing the boot process includes obtaining a decryption key.

13. The process according to claim 12, wherein the decryption key is located in a memory arrangement.

14. The process according to claim 13, wherein the memory arrangement is a trusted platform module.

15. The process according to claim 11, wherein the performing the boot process only when the second digest is equal to the first digest comprises:
  obtaining a key from a trusted platform module; and
  decrypting at least one partition of the operating system.

\* \* \* \* \*